US012259743B2

(12) United States Patent
Mouret et al.

(10) Patent No.: US 12,259,743 B2
(45) Date of Patent: Mar. 25, 2025

(54) BANDGAP REFERENCE CIRCUIT WITH TRIMMING CIRCUIT

(71) Applicant: NXP USA, Inc., Austin, TX (US)

(72) Inventors: Guillaume Mouret, Portet-sur-Garonne (FR); Yann Cargouet, Portet-sur-Garonne (FR); Thierry Michel Alain Sicard, Haute Garonne (FR)

(73) Assignee: NXP USA, Inc., Austin, TX (US)

( * ) Notice: Subject to any disclaimer, the term of this patent is extended or adjusted under 35 U.S.C. 154(b) by 239 days.

(21) Appl. No.: 18/168,767

(22) Filed: Feb. 14, 2023

(65) Prior Publication Data

US 2023/0266786 A1 Aug. 24, 2023

(30) Foreign Application Priority Data

Feb. 24, 2022 (EP) .................................... 22305207

(51) Int. Cl.
*G05F 3/26* (2006.01)

(52) U.S. Cl.
CPC .................................... *G05F 3/267* (2013.01)

(58) Field of Classification Search
CPC ....................................................... G05F 3/267
See application file for complete search history.

(56) References Cited

U.S. PATENT DOCUMENTS

| | | | |
|---|---|---|---|
| 6,181,121 B1 | 1/2001 | Kirkland et al. | |
| 10,890,935 B2 | 1/2021 | Mouret et al. | |
| 2009/0108917 A1* | 4/2009 | Chellappa | G05F 3/30 327/539 |
| 2013/0093504 A1* | 4/2013 | Nag | G05F 3/16 327/539 |
| 2017/0147028 A1 | 5/2017 | Arnold et al. | |
| 2019/0025868 A1* | 1/2019 | Segarra | G05F 3/30 |
| 2020/0233445 A1 | 7/2020 | Mouret | |
| 2020/0379498 A1* | 12/2020 | Hermann | B60R 16/03 |

* cited by examiner

*Primary Examiner* — Jue Zhang
*Assistant Examiner* — Lakaisha Jackson

(57) ABSTRACT

A bandgap reference circuit includes a first current generator having first and second bipolar transistors for generating a first current that varies proportionally as a function of temperature. A second current generator includes a field effect transistor for generating a second current that varies inversely as a function of temperature. A trimming circuit includes a third bipolar transistor sized to match the first bipolar transistor, a third current generator having a second field effect transistor coupled to a collector and base of the third bipolar transistor to generate a third current based on a base current of the third bipolar transistor, and a trim control circuit configured to modify the second current by adding the third current to or subtracting the third current from the second current based on a trim control signal. A bandgap reference current is generated by summing the first current and the modified second current.

20 Claims, 2 Drawing Sheets

BANDGAP REFERENCE CIRCUIT WITH TRIMMING CIRCUIT

CROSS-REFERENCE TO RELATED APPLICATIONS

This application claims the priority under 35 U.S.C. § 119 of European Patent application no. 22305207.7, filed on Feb. 24, 2022, the contents of which are incorporated by reference herein.

BACKGROUND

Field

This disclosure relates generally to integrated circuits, and more specifically, to a bandgap reference circuit with a trimming circuit to generate a voltage or current reference.

Related Art

Bandgap reference circuits are used to develop a constant reference voltage or reference current. Conventional bandgap reference circuits use an operational amplifier which is configured to force its inputs to be equal, thereby causing currents to be equal or to cause certain voltages to be equal. Conventional bandgap reference circuits may generate a bandgap reference voltage and then translate the bandgap reference voltage into a current. For example, existing bandgap reference circuits will typically combine a first current that is proportional to absolute temperature (PTAT) and a second current that is inversely proportional or complementary to absolute temperature (CTAT) to form a reference or bias current that is applied to an output resistor to generate the reference voltage. The most popular bandgap circuits employ a Brokaw, Widlar, or Kuijk topology which compensate the CTAT voltage ($V_{BE}$) developed across the base-emitter voltage of a bipolar transistor by a factor K (close to 10) multiplied by the PTAT voltage ($\Delta V_{BE}$) to give a temperature-independent voltage reference that is close to 1.2V (gap voltage of silicon). In addition, there are sub-bandgap reference circuits that compensate the PTAT voltage ($\Delta V_{BE}$) by a ratio of the CTAT voltage ($V_{BE}$) to provide a sub-bandgap reference voltage of 120 mV that could be amplified to generate a higher voltage.

For example, a conventional bandgap reference voltage circuit includes a first BiCMOS circuit for generating a PTAT current, a second BiCMOS circuit for generating a CTAT current, and a third circuit for generating a bias current by summing the CTAT current and PTAT current. However, the implementation of such conventional bandgap reference voltage circuits requires large numbers of circuit components, including bipolar transistors which can contribute errors to the generated reference current. As seen from the foregoing, the existing bandgap reference circuit solutions are extremely difficult at a practical level by virtue of the challenges with generating accurate bandgap reference currents and voltages, especially as the number of circuit components add to the size, cost, errors, and circuit complexity.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
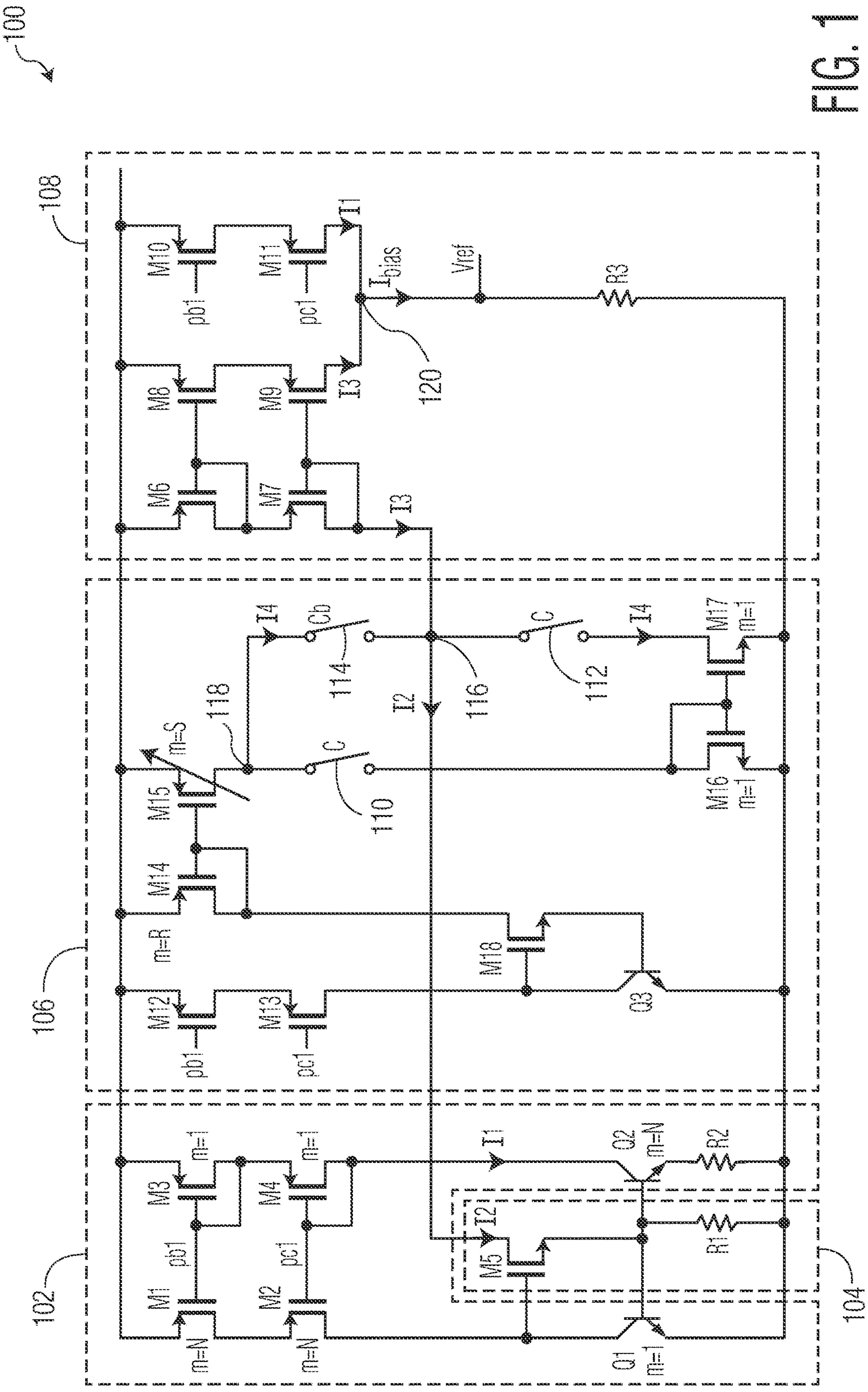
FIG. 1 is a schematic circuit depiction of a first bandgap reference circuit with a base current compensation circuit in accordance with embodiments of the present disclosure.

Embodiments of a low supply voltage BiCMOS self-biased bandgap reference circuit and methodology are described for accurately generating a bandgap reference voltage with linear performance over a range of temperatures and process/mismatch variations. In selected embodiments, the bandgap reference circuit generates a reference current and a 1V reference voltage (or smaller). In selected embodiments, differently-sized bipolar transistors may include a first bipolar transistor having a sizing reference of m=1, and a second bipolar transistor having a sizing reference of m=N which is constructed with a combination of N bipolar transistors having a sizing reference of m=1 connected in parallel, for a total of N+1 bipolar transistors. First and second circuit branches are connected, respectively, to the first and second bipolar transistors, to generate a first current that is a proportional to absolute temperature (PTAT). A third circuit branch including a first field effect transistor (FET) connected to the bases of the first and second bipolar transistors generates a second current that is inversely proportional or complementary to absolute temperature (CTAT). A trimming circuit modifies the second current by adding or subtracting a third current in accordance with a trim control signal, in which the third current represents a fraction of the base current of the first bipolar transistor. The trimming circuit includes a third bipolar transistor in a fourth circuit branch, as well as current mirrors, to generate the third current and includes a trim control circuit to add or subtract the third current. A summation circuit sums copies of the first current and the modified second current to generate a bandgap reference current (Ibias) and reference voltage (Vref) at an output node. A trim control signal indicative of the fraction of the base current to add or subtract can be determined for each bandgap reference circuit using test equipment to increase the accuracy of the output reference voltage over a range of temperatures.

By simultaneously generating the reference current (Ibias) and reference voltage (Vref) to generate the CTAT current, a smaller bandgap reference circuit is provided with improved accuracy and temperature independence than previously known. Additional improvements for the bandgap reference circuit are provided to remove base current contributions from the bipolar transistors to the generated reference current, to generate a reference current with zero temperature coefficient (TC) variation, and/or to remove other error contributions to the reference current. For example, each bandgap reference circuit can be calibrated in accordance with the trim control signal in order to improve accuracy by reducing the curvature of the bandgap reference voltage over temperature as compared to currently available techniques. Therefore, in some embodiments, a bandgap reference circuit is provided which can directly generate reference currents with the reference voltages, which minimizes the need for extra circuitry to maintain stability in a feedback loop, which provides a PTAT current, a CTAT current, or combination of both currents, as outputs, and which provides low voltage operation (e.g., may operate at 1 volt or lower across all process corners).

Referring to FIG. 1, a schematic diagram of bandgap reference voltage circuit 100 is illustrated that includes a first current generator block (or circuit) 102, a second current generator block (or circuit) 104, a trimming block (or circuit) 106, and a current summing block (or circuit) 108. Bandgap reference voltage circuit 100 can be implemented on an integrated circuit, such as in a System on a Chip (SoC). Current generator circuit 102 includes FET transistors M1-M4, bipolar transistors Q1-Q2, and resistor R2 configured to generate a PTAT current, IPTAT, across R2. In the embodiment shown, transistors M1-M4 are PMOS transistors configured as a cascode current mirror. Transistor M1 includes a source electrode coupled to supply voltage VDD, a drain electrode coupled to a source electrode of transistor M2, and a gate electrode coupled to a gate electrode of transistor M3. Transistor M2 further includes a drain electrode coupled to a collector of bipolar transistor Q1, and a gate electrode coupled to a gate electrode of transistor M4. Transistor M3 includes a source electrode coupled to supply voltage VDD, a drain electrode coupled to a source electrode of transistor M4, and a gate electrode coupled to the gate electrode of transistor M1 and its own drain electrode. The voltage at the gates of transistors M1 and M3 is shown as bias voltage PB1. Transistor M4 further includes a drain electrode coupled to a collector of bipolar transistor Q2, and a gate electrode coupled to a gate electrode of transistor M2 and its own drain electrode. The voltage at the gates of transistors M2 and M4 is shown as cascode bias voltage PC1. Transistor Q1 further includes a base electrode coupled to the base electrode of transistor Q2 and an emitter electrode coupled to supply voltage VSS. Transistor Q2 further includes a base electrode coupled to the base electrode of transistor Q2 and an emitter electrode coupled to a first terminal of resistor R2. Resistor R2 further includes a second terminal coupled to supply voltage VSS.

Current generator circuit 104 includes FET transistor M5 and resistor R1 configured to generate a CTAT current, ICSTAT, across R1. Transistor M5 is an NMOS transistor having a drain electrode coupled to a circuit node 116, a source electrode coupled to base electrodes of bipolar transistors Q1 and Q2, and a gate electrode coupled to the drain electrode of transistor M2 and the collector electrode of transistor Q1. Resistor R1 includes a first terminal coupled to the base electrodes of transistors Q1 and Q2 and a second terminal coupled to supply voltage VSS.

Trimming circuit 106 includes PMOS transistors M12-M15, NMOS transistors M16–M18, bipolar transistor Q3, and switches 110, 112, and 114, and helps improve accuracy of the output of bandgap reference voltage circuit 100 by decreasing curvature of the output voltage over a range of temperatures. Note that trimming circuit 106 may also be referred to as a calibration circuit, base current compensation circuit, or correction circuit, and switches 110, 112, and 114 may collectively be referred to as a trim control circuit. Transistor M12 includes a source electrode coupled to supply voltage VDD, a gate electrode coupled to receive bias voltage PB1, and a drain electrode coupled to the source electrode of transistor M13. Transistor M13 further includes a gate electrode coupled to receive bias voltage PC1 and a drain electrode coupled to a gate electrode of transistor M18 and a collector electrode of Q3. A base electrode of transistor Q3 is coupled to a source electrode of transistor M18, and an emitter electrode is coupled to supply voltage VSS. PMOS transistors M14 and M15 are configured as a first current mirror with source electrodes coupled to supply voltage VDD, and gate electrodes coupled to one another. A drain electrode of transistor M14 is coupled to the gate electrode of transistor M14 and to the drain electrode of transistor M18. A drain electrode of transistor M15 is coupled to circuit node 118. A first terminal of each of switches 110 and 114 is coupled to node 118. NMOS transistors M16 and M17 are configured as a second current mirror with source electrodes coupled to supply voltage VSS, and gate electrodes coupled to one another. A drain electrode of transistor M16 is coupled to the gate electrode of transistor M16 and to a second terminal of switch 110. A second terminal of switch 114 is coupled to a first terminal of switch 112. A drain electrode of transistor M17 is coupled to a second terminal of switch 112.

Switches 110 and 112 each have a control terminal coupled to receive control value C, and switch 114 has a control terminal coupled to receive control value Cb, which is the complement of control value C. The control values C and Cb can be provided as part of a trim control value, which can be stored anywhere within the System on Chip (SoC) containing the bandgap reference circuit 100. When the control value for control terminal of a switch is asserted (to a logic level one), the switch is closed or on, so as to be conductive between its first and second terminals, and when the control value is negated (to a logic level zero), the switch is open or off, so as to be non-conductive between its first and second terminals. Since C and Cb are complementary, when switches 110 and 112 are closed, switch 114 is open, and vice versa. (Note that the switches illustrated herein in FIGS. 1 and 2 can be implemented in any known manner.)

Current summing circuit 108 includes PMOS transistors M6-M11. Transistor M6-M9 are configured as a cascode current mirror. Transistor M6 includes a source electrode coupled to supply voltage VDD, a drain electrode coupled to a source electrode of transistor M7, and a gate electrode coupled to a gate electrode of transistor M8. Transistor M7 further includes a drain electrode coupled to the drain electrode of transistor M5 and to its own gate electrode, and the gate electrode is coupled to a gate electrode of transistor M9. Transistor M8 includes a source electrode coupled to supply voltage VDD, a drain electrode coupled to a source electrode of transistor M9, and a gate electrode coupled to the gate electrode of transistor M5 and to its own drain electrode. Transistor M9 further includes a drain electrode coupled to a circuit node 120, and a gate electrode coupled to a gate electrode of transistor M7.

Transistor M10 includes a source electrode coupled to supply voltage VDD, a drain electrode coupled to a source electrode of transistor M11, and a gate electrode coupled to receive bias voltage PB1. Transistor M11 further includes a drain electrode coupled to node 120, and a gate electrode coupled to receive bias voltage PC1. A resistor R3 has a first terminal coupled to node 120 and a second terminal coupled to supply voltage VSS. As depicted, node 120 combines the currents from transistors M8/M9 and M10/M11 to generate the reference current (Ibias) and reference voltage (Vref) at an output node corresponding to node 120 and the first terminal of R3.

The bipolar transistors Q1-Q2 may be implemented as bipolar-junction transistors, and transistors M1-M11 may be implemented as CMOS transistors. In the embodiment shown, transistors M1-M4 and M6-M11 are PMOS transistors and transistor M5 is an NMOS transistor. In addition, transistors M3, M4 are shown having a sizing reference of m=1, while transistors M1-M2 are shown with a sizing reference of m=M to indicate that the transistors M1, M2, have a size that may be an integer (or integer fraction) multiple M greater than the size of the M3, M4 transistors. Likewise, bipolar transistor Q1 is shown having a sizing reference of m=1, while the bipolar transistor Q2 is shown with a sizing reference of m=N to indicate that the bipolar transistor Q2 has a size that may be an integer (or integer fraction) multiple N greater than the size of the Q1 transistor.

In operation, current generator 102 forms a first circuit branch M1/M2/Q1 and a second circuit branch M3/M4/Q2/R2. Second current generator 104 forms part of a third circuit branch M6/M7/M5/R1, in which the current I2 flowing from M5 is flowing into node 116. (Therefore, note that transistors M6/M7 may be considered as part of second current generator 104 in addition to summing circuit 108.) Trimming circuit 106 includes a fourth circuit branch M12/M13/Q3 which is intended to replicate the first circuit branch such that base current of Q3 matches the base current, Ib, of Q1. Transistor M18 provides access to this replicated base current, which is provided as an input to the current mirror formed of M14/M15. The sizing of M15 can be selected in order to set the ratio of M14 to M15 (R:S) to provide the desired fraction of the base current (corresponding to current I4) at the output of the current mirror to node 118. With switch 114 closed and switches 110 and 112 open, current I4 is added to current I2 at node 116, resulting in current I3 through M6/M7 being “I2+I4”. With switch 110 and 112 closed and switch 114 open, current I4 is mirrored by M16/M17 (with a 1:1 ratio, since m=1 for both) and subtracted from current I2 at node 116, resulting in I3 through M6/M7 being “I2-I4”. Therefore, I3 (equivalent to “I2+/−I4”) flows through M6/M7, in which M6/M7 form a current mirror having an input at node 116 so as to mirror current I3 through M8/M9. Transistors M10 and M11 are connected to replicate current flowing into transistors M3/M4. Therefore, Ibias=I3+I1=(I2+/−I4)+I1, and Vref=Ibias*R3.

Current generator 102 develops a first voltage over R2 based on the voltage difference of the base-emitter junctions of transistors Q1 and Q2, which are generally biased at different current densities due to their different sizes. The first voltage over R2 generates the PTAT current (IPTAT). Therefore, the current into Q2, labeled as I1, can be represented as I1=IPTAT−Ib, in which Ib is the base current of Q2. I1 can further be defined as I1=[(Vbe1−Vbe2)/R2]−1b, in which Vbe1 is the base-emitter voltage of Q1 and Vbe2 the base-emitter voltage of Q2.

Transistor Q1 and the combination of transistors M6/M7/M5/R1 generate I2, with R1 connected across Vbe1. As the base-emitter voltage Vbe1 is inverse or complementary to absolute temperature by virtue of decreasing by almost 2 mV/degree, the current flowing into the first resistor R1 is the CTAT current (ICTAT). Assuming that the first order temperature variation (TC1) of the first resistor R1 is negligible and with transistor M5 connected between the collector and base of bipolar transistor Q1, the current provided by M5, labeled as I2, can be represented as I2=ICTAT+2*Ib. Since the base current of a bipolar transistor is equal to collector current of the bipolar divided by the beta of the bipolar, and the beta has a non-negligible variation over process, compensation of the base current due to process variation is needed to improve accuracy such that the output voltage reference, Vref, is no longer dependent on the base current.

With current techniques of base current compensation, a curvature of 3 mV in Vref over a temperatures can be achieved. However, for some applications, this curvature fails to provide the required accuracy of Vref over process variations. Trimming circuit 106 adjusts the proportion of the base current Ib injected into the output voltage, Vref, to further reduce this curvature and improve accuracy. In some cases, the curvature can be reduced to 0.7 mV. Trimming circuit 106 achieves this by adding or retrieving a fraction of the base current (corresponding to I4) to or from the output current, Ibias, thus compensating for the base current in Vref. As described above in reference to FIG. 1, =ICTAT+2*lb, 11=IPTAT-Ib, and Ibias=I1+I3. However, I3=I2+/−I4, in which 14 is the fraction of the base current added to or retrieved from I2. By setting I4 and the trim values C and Cb properly, trim circuit 106 can properly compensate for the base current and improve accuracy accordingly.

Figure 2:
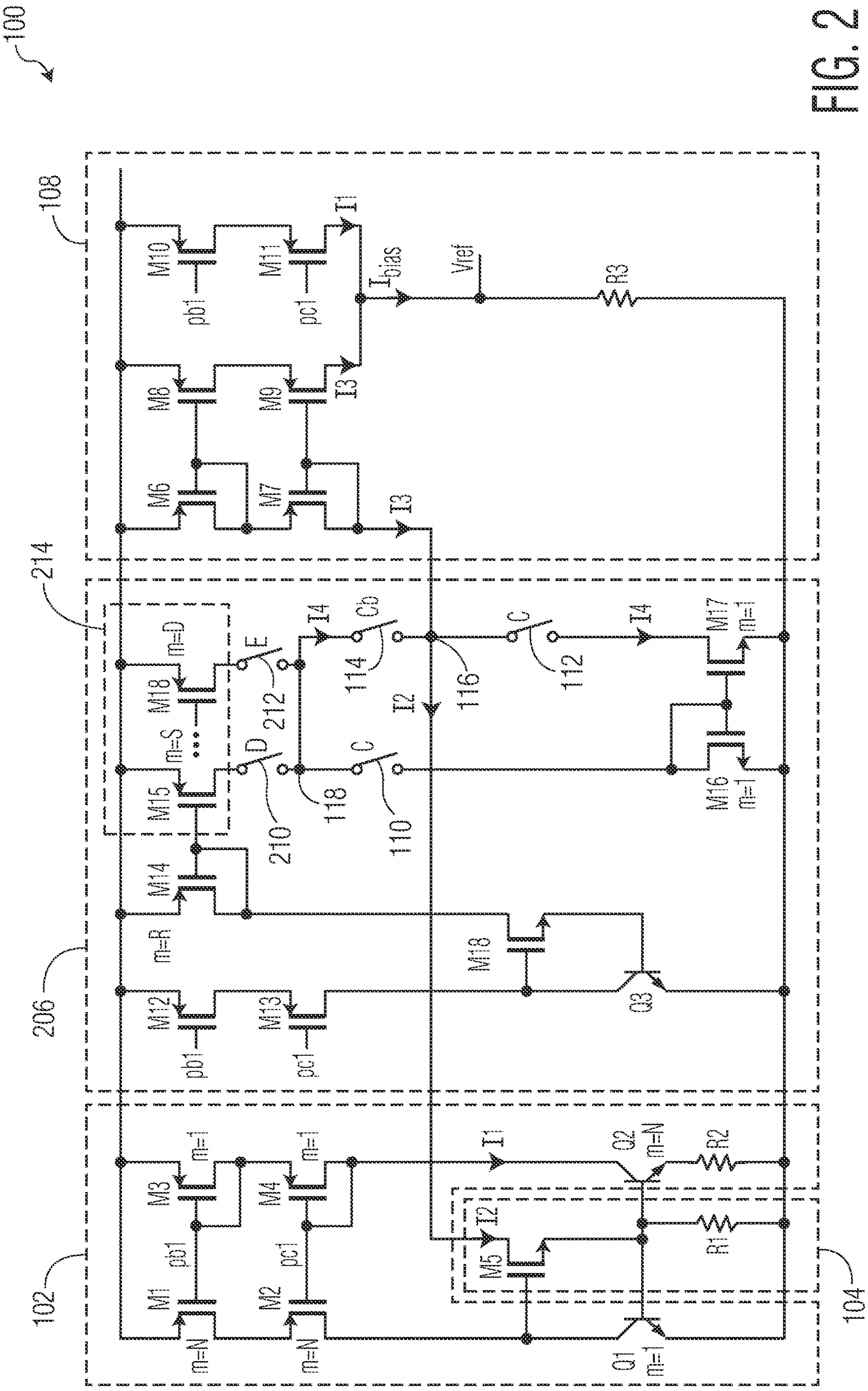
FIG. 2 is a schematic circuit depiction of a second bandgap reference circuit with a base current compensation circuit in accordance with embodiments of the present disclosure.

The ratio between M15 and M14 defined by S:R (i.e., S/R) allows the fraction of Ib which is added or retrieved to be set as desired to achieve the best result. Similarly, the values of C and Cb can be set accordingly to either add or subtract the resulting 14 to or from 13. For example, during testing of each part, the proportion of Ib that is injected can be adjusted to determine the fraction that works best. FIG. 2 illustrates bandgap reference circuit 100 in accordance with an alternate embodiment, in which trimming circuit 106 is instead implemented with trimming circuit 206. Trimming circuit 206 is the same as trimming circuit 106 except that trimming 206 includes an adjustable current mirror ratio for the current mirror implemented by M14/M15 in order to appropriately set the fraction of Ib. In one embodiment, in the current mirror, a set of selectable PMOS transistors 214, including M15 and M18, coupled in parallel are used in place of M15 of FIG. 1 to set the desired ratio.

As illustrated in FIG. 2, the sources of M14 and of each transistor in set 214 is coupled to supply voltage VSS. The gates of each transistor in set 214 is coupled to the gate of M14, and the drains of each transistor in set 214 is coupled to a first terminal of a corresponding switch, and the second terminals of these corresponding switches are coupled to node 118. For example, a drain of M15 is coupled to a first terminal of switch 210, and a second terminal of switch 210 is coupled to node 118, and a drain of M18 is coupled to a first terminal of switch 212, and a second terminal of switch 212 is coupled to node 118. (These switches, as with switches 110, 112, and 114, may be referred to as part of the trim control circuit.) Each of the corresponding switches receives a corresponding control signal, D−E. As with control signal C, if any of these control signals are asserted, the corresponding switch is closed, but open if negated. Therefore, the control trim value, in addition to providing the values of C/Cb to determine whether or not 14 should be added or subtracted at node 116, can also provide the values of each of D−E to either increase or decrease the fraction of Ib (i.e. 14) that is provided at the output of the first current mirror at node 118. By changing the number of transistors coupled in parallel in the current mirror, the ratio of the current mirror is likewise adjusted.

Therefore, during testing of each part, the proportion of Ib that is injected can be adjusted by varying the values of D-E and the values of C/Cb can be varied to add or subtract the fraction of Ib to determine how best to set and use 14 to obtain the desired accuracy for Vref, and these trim control values can be stored as a trim control value (or as multiple trim control values) on each part or set of parts. For example, during testing, the fraction of Ib can be adjusted until the second derivative of Vref can be as close to zero as possible over a range of temperatures. With the use of trimming circuit 106 or 206 and the corresponding trim control values, bandgap reference circuit 100 can generate smaller and more accurate bandgap reference voltages than previously possible. For example, the curvature of Vref over temperature can be reduced to 0.7 mV or less.

Therefore, by now it can be appreciated how an improved bandgap circuit generates both a bandgap reference voltage and reference current with a greater accuracy as compared to other bandgap circuits available today. A trimming circuit with an additional bipolar transistor is used to provide a copy of the base current of a bipolar transistor used in generating the PTAT and CTAT currents. The trimming circuit also uses an additional FET transistor and current mirrors to generate a current representative of a fraction of the base current of the additional bipolar transistor. This generated current is either added or subtracted from the CTAT current based on a trim control value, and a sum of the PTAT current and the modified CTAT current produce the resulting bandgap reference current. By using the fraction of the base current of the additional bipolar transitions, effects of the base current can be compensated over temperature, thus producing a more robust and accurate bandgap reference current and voltage over process variations.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name, a "b" following the signal name, or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, different circuit configurations can be used to adjust the R:S ratio of the first current mirror of trim circuit 106 or 206. Also, note that multiple FETs in parallel can be used to implement any of the illustrated FETs. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a bandgap reference circuit includes a first current generator having first and second circuit branches respectively having first and second bipolar transistors having different sizing reference values for generating a first current at a first resistor, wherein the first current varies proportionally as a function of temperature; a second current generator having a third circuit branch having a first field effect transistor for generating a second current at a second resistor, wherein the second current varies inversely as a function of temperature; a trimming circuit; and a third circuit. The trimming circuit includes a fourth circuit branch having a third bipolar transistor which is sized to match the first bipolar transistor; a third current generator having a second field effect transistor coupled to a collector and a base of the third bipolar transistor and configured to generate a third current based on a base current of the third bipolar transistor; and a trim control circuit configured to modify the second current by adding the third current to the second current or subtracting the third current from the second current based on a first trim control signal. The third circuit is configured to generate a bandgap reference current based on a summation of the first current and the modified second current. In one aspect, the third circuit includes an output branch summation circuit having a fifth circuit branch and sixth circuit branch for respectively mirroring the first current and modified second current, in which the output branch summation circuit combines the currents from the fifth and sixth circuit branches to generate the bandgap reference current and a bandgap reference voltage at an output node. In another aspect, the base current of the third bipolar transistor matches a base current of the first bipolar transistor. In another aspect, the second field effect transistor has a gate electrode coupled to the collector of the third bipolar transistor and a source electrode coupled to the base of the third bipolar transistor. In a further aspect, the third current generator comprises a first current mirror having an input coupled to a drain of the second field effect transistor and an output to provide a first mirror current as a fraction of the base current of the third bipolar transistor. In yet a further aspect, the third current generator includes a second current mirror having an input coupled to receive the first mirror current from the first current mirror and an output to provide a second mirror current. In yet an even further aspect, when the first trim control signal has a first value, the first mirror current is provided as the third current which is added to the second current, and when the first trim control signal has a second value, the second mirror current is provided as the third current which is subtracted from the second current. In yet an even further aspect, the first current mirror includes a third first field effect transistor having a drain electrode and a gate electrode coupled to the drain of the second field effect transistor, and a set of selectable transistors, wherein one or more of the set of selectable transistors are selected based on a second trim control signal, wherein each of the selected one or more selectable transistors has a gate electrode coupled to the gate electrode of the third field effect transistor and a source electrode coupled to the output of the first current mirror, wherein the fraction of the base current of the third bipolar transistor is based on how many of the set of selectable transistors are selected. In yet an even further aspect, each selectable transistor of the set of selectable transistors is coupled to the output of the first current mirror via a corresponding switch which is set to be closed or open based on the second trim control signal. In another further aspect, the trim control circuit includes a first switch coupled between the output of the first current mirror and the input of the second current mirror, a second switch coupled between a drain of the first field effect transistor and the output of the second current mirror, and a third switch coupled between the output of the first current mirror and the drain of the first field effect transistor. In yet a further aspect, the first and second switches are open, and the third switch is closed when the first trim control signal has the first value, and the first and second switches are closed, and the third switch is open when the first trim control signal has the second value. In another further aspect, the first mirror current has a magnitude which is equal to a magnitude of the second mirror current.

In another embodiment, a bandgap reference circuit includes a first current generator having first and second circuit branches respectively comprising first and second bipolar transistors having different sizing reference values for generating a first current at a first resistor, wherein the first current varies proportionally as a function of temperature; a second current generator having a third circuit branch having a first field effect transistor for generating a second current at a second resistor, wherein the second current varies inversely as a function of temperature; a trimming circuit; and a third circuit. The trimming circuit includes a fourth circuit branch having a third bipolar transistor which is sized to match the first bipolar transistor; a second field effect transistor coupled to a collector and a base of the third bipolar transistor; a first current mirror having an input coupled to a drain of the second field effect transistor and an output to provide a first mirror current as a fraction of a base current of the third bipolar transistor; and a second current mirror having an input coupled to receive the first mirror current and an output to provide a second mirror current; and a trim control circuit configured to modify the second current by adding the first mirror current to the second current when a first trim control signal has a first value or subtracting the second mirror current from the second current based when the first trim control signal has a second value. The third circuit is configured to generate a bandgap reference current based on a summation of the first current and the modified second current. In one aspect of another embodiment, the first and third bipolar transistors are sized to match such that the base current of the third bipolar transistor matches a base current of the first bipolar transistor. In another aspect, the second field effect transistor has a gate electrode coupled to the collector of the third bipolar transistor and a source electrode coupled to the base of the third bipolar transistor. In yet another aspect, the trimming circuit includes a first switch coupled between the output of the first current mirror and the input of the second current mirror, a second switch coupled between a drain of the first field effect transistor and the output of the second current mirror, and a third switch coupled between the output of the first current mirror and the drain of the first field effect transistor. In a further aspect, the first and second switches are open, and the third switch closed when the first trim control signal has the first value, and the first and second switches are closed and the third switch open when the first trim control signal has the second value. In another aspect of the another embodiment, the first mirror current has a magnitude which is equal to a magnitude of the second mirror current.

In yet another embodiment, a method of generating a bandgap reference current includes generating a first current at a first resistor using first and second bipolar transistors having different sizing reference values, wherein the first current varies proportionally as a function of temperature; generating a second current at a second resistor using a first field effect transistor, wherein the second current varies inversely as a function of temperature; generating a third current as a fraction of a base current of a third bipolar transistor sized to match the first bipolar transistor; adjusting the second current by: adding the third current to the second current when a trim control value has a first value, or subtracting the third current from the second current when the trim control value has a second value; and generating a bandgap reference current based on summing the first current and the adjusted second current. In one aspect, the generating the third current is performed using a second field effect transistor having a gate electrode coupled to a collector of the third bipolar transistor and a source electrode coupled to the base of the third bipolar transistor, and a current mirror having an input coupled to a drain electrode of the second field effect transistor and an output configured to provide a mirror current as a fraction of the base current of the third bipolar transistor, wherein the third current is based on the mirror current.

The invention claimed is:

1. A bandgap reference circuit comprising:

a first current generator comprising first and second circuit branches respectively comprising first and second bipolar transistors having different sizing reference values for generating a first current at a first resistor, wherein the first current varies proportionally as a function of temperature, a second current generator comprising a third circuit branch comprising a first field effect transistor for generating a second current at a second resistor, wherein the second current varies inversely as a function of temperature;

a trimming circuit comprising:

a fourth circuit branch comprising a third bipolar transistor which is sized to match the first bipolar transistor;

a third current generator comprising a second field effect transistor coupled to a collector and a base of the third bipolar transistor and configured to generate a third current based on a base current of the third bipolar transistor, and a trim control circuit configured to modify the second current by adding the third current to the second current or subtracting the third current from the second current based on a first trim control signal; and a third circuit configured to generate a bandgap reference current based on a summation of the first current and the modified second current.

2. The bandgap reference circuit of claim 1, wherein the third circuit comprises an output branch summation circuit comprising a fifth circuit branch and sixth circuit branch for respectively mirroring the first current and modified second current, wherein the output branch summation circuit combines the currents from the fifth and sixth circuit branches to generate the bandgap reference current and a bandgap reference voltage at an output node.

3. The bandgap reference circuit of claim 1 or 2, wherein the base current of the third bipolar transistor matches a base current of the first bipolar transistor.

4. The bandgap reference circuit of any preceding claim 1, wherein the second field effect transistor has a gate electrode coupled to the collector of the third bipolar transistor and a source electrode coupled to the base of the third bipolar transistor.

5. The bandgap reference circuit of claim 4, wherein the third current generator comprises a first current mirror having an input coupled to a drain of the second field effect transistor and an output to provide a first mirror current as a fraction of the base current of the third bipolar transistor.

6. The bandgap reference circuit of claim 5, wherein the third current generator comprises a second current mirror having an input coupled to receive the first mirror current from the first current mirror and an output to provide a second mirror current.

7. The bandgap reference circuit of claim 6, wherein, when the first trim control signal has a first value, the first mirror current is provided as the third current which is added to the second current, and when the first trim control signal has a second value, the second mirror current is provided as the third current which is subtracted from the second current.

8. The bandgap reference circuit of claim 7, wherein the first current mirror comprises:

a third first field effect transistor having a drain electrode and a gate electrode coupled to the drain of the second field effect transistor, and a set of selectable transistors, wherein one or more of the set of selectable transistors are selected based on a second trim control signal, wherein each of the selected one or more selectable transistors has a gate electrode coupled to the gate electrode of the third field effect transistor and a source electrode coupled to the output of the first current mirror, wherein the fraction of the base current of the third bipolar transistor is based on how many of the set of selectable transistors are selected.

9. The bandgap reference circuit of claim 8, wherein each selectable transistor of the set of selectable transistors is coupled to the output of the first current mirror via a corresponding switch which is set to be closed or open based on the second trim control signal.

10. The bandgap reference circuit of claim 7, wherein the trim control circuit comprises a first switch coupled between the output of the first current mirror and the input of the second current mirror, a second switch coupled between a drain of the first field effect transistor and the output of the second current mirror, and a third switch coupled between the output of the first current mirror and the drain of the first field effect transistor.

11. The bandgap reference circuit of claim 10, wherein:

the first and second switches are open and the third switch is closed when the first trim control signal has the first value, and the first and second switches are closed, and the third switch is open when the first trim control signal has the second value.

12. The bandgap reference circuit of claim 7, wherein the first mirror current has a magnitude which is equal to a magnitude of the second mirror current.

13. A method of generating a bandgap reference current, comprising:

generating a first current at a first resistor using first and second bipolar transistors having different sizing reference values, wherein the first current varies proportionally as a function of temperature;

generating a second current at a second resistor using a first field effect transistor, wherein the second current varies inversely as a function of temperature;

generating a third current as a fraction of a base current of a third bipolar transistor sized to match the first bipolar transistor;

adjusting the second current by:

adding the third current to the second current when a trim control value has a first value, or subtracting the third current from the second current when the trim control value has a second value; and generating a bandgap reference current based on summing the first current and the adjusted second current.

14. The method of claim 13, wherein the generating the third current is performed using:

a second field effect transistor having a gate electrode coupled to a collector of the third bipolar transistor and a source electrode coupled to the base of the third bipolar transistor, and a current mirror having an input coupled to a drain electrode of the second field effect transistor and an output configured to provide a mirror current as a fraction of the base current of the third bipolar transistor, wherein the third current is based on the mirror current.

15. A bandgap reference circuit comprising:

a first current generator comprising first and second circuit branches respectively comprising first and second bipolar transistors having different sizing reference values for generating a first current at a first resistor, wherein the first current varies proportionally as a function of temperature;

a second current generator comprising a third circuit branch comprising a first field effect transistor for generating a second current at a second resistor, wherein the second current varies inversely as a function of temperature;

a trimming circuit comprising:

a fourth circuit branch comprising a third bipolar transistor which is sized to match the first bipolar transistor;

a second field effect transistor coupled to a collector and a base of the third bipolar transistor;

a first current mirror having an input coupled to a drain of the second field effect transistor and an output to provide a first mirror current as a fraction of a base current of the third bipolar transistor; and a second current mirror having an input coupled to receive the first mirror current and an output to provide a second mirror current; and a trim control circuit configured to modify the second current by adding the first mirror current to the second current when a first trim control signal has a first value or subtracting the second mirror current from the second current based when the first trim control signal has a second value; and a third circuit configured to generate a bandgap reference current based on a summation of the first current and the modified second current.

16. The bandgap reference circuit of claim 15, wherein the first and third bipolar transistors are sized to match such that the base current of the third bipolar transistor matches a base current of the first bipolar transistor.

17. The bandgap reference circuit of claim 15, wherein the second field effect transistor has a gate electrode coupled to the collector of the third bipolar transistor and a source electrode coupled to the base of the third bipolar transistor.

18. The bandgap reference circuit of claim 15, wherein the trimming circuit comprises a first switch coupled between the output of the first current mirror and the input of the second current mirror, a second switch coupled between a drain of the first field effect transistor and the output of the second current mirror, and a third switch coupled between the output of the first current mirror and the drain of the first field effect transistor.

19. The bandgap reference circuit of claim 18, wherein:

the first and second switches are open and the third switch closed when the first trim control signal has the first value, and the first and second switches are closed and the third switch open when the first trim control signal has the second value.

20. The bandgap reference circuit of claim 15, wherein the first mirror current has a magnitude which is equal to a magnitude of the second mirror current.

* * * * *